Oct. 27, 1936.   I. RUSK   2,058,634
SOLDERING TOOL ATTACHMENT
Filed June 27, 1935   2 Sheets-Sheet 1
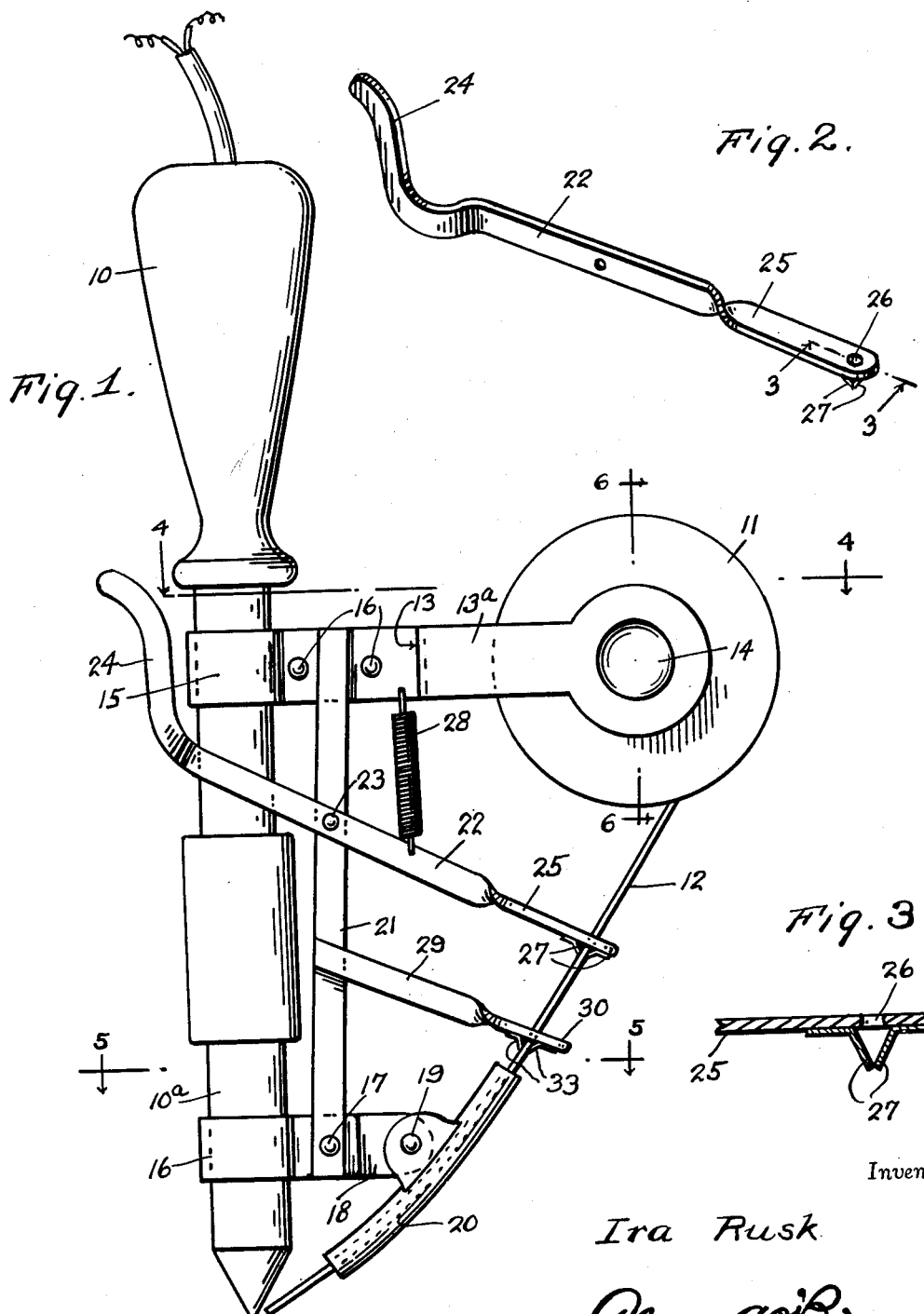
Inventor
Ira Rusk
By Clarence A. O'Brien
Attorney Oct. 27, 1936.   I. RUSK   2,058,634
SOLDERING TOOL ATTACHMENT
Filed June 27, 1935   2 Sheets-Sheet 2

Inventor
Ira Rusk
By Clarence A. O'Brien
Attorney

Patented Oct. 27, 1936

2,058,634

UNITED STATES PATENT OFFICE 2,058,634

SOLDERING TOOL ATTACHMENT

Ira Rusk, Chicago, Ill.

Application June 27, 1935, Serial No. 28,740

1 Claim. (Cl. 113—109)

This invention relates to soldering irons and an object of the invention is to provide an improved attachment for the feeding of the solder in wire or ribbon form from a reel on the tool to the head end of the tool so as to flow onto the work directly from the tool, and consists principally in the provision of novel means for advancing the ribbon solder to the point of the tool where it is used, and also in the provision of novel means for mounting the solder spool.

The invention together with its objects and advantages will be best understood from a study of the following description taken in connection with the accompanying drawings wherein:

Figure 1 is a side elevational view of a soldering tool illustrating the application of the invention.

Figure 2 is a perspective view of a trigger member.

Figure 3 is a detail view taken substantially on the line 3—3 of Figure 2.

Figure 4:
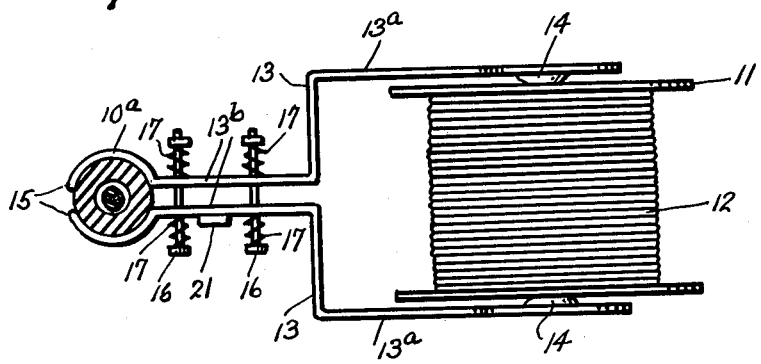
Figure 5:
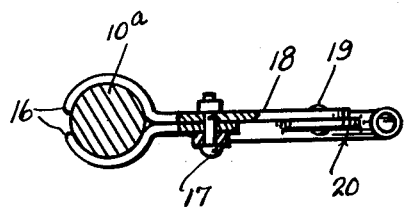
Figure 6:
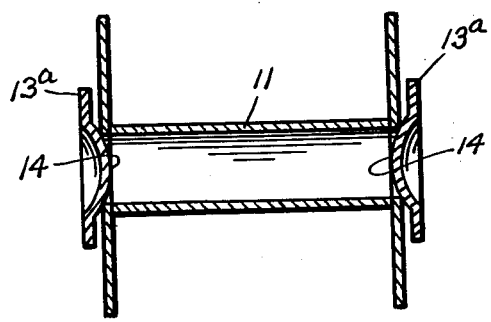

Figures 4, 5, and 6 are detail views taken substantially on the lines 4—4, 5—5 and 6—6 respectively of Figure 1.

Figure 7:
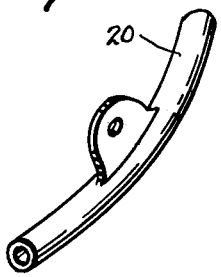

Figure 7 is a perspective view of a guide member.

Figure 8:
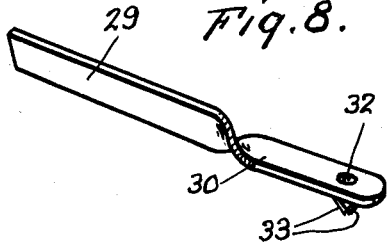

Figure 8 is a perspective view of a member provided for preventing retrograde movement of the solder-ribbon as it is being advanced to the point of the tool for use.

Referring to the drawings by reference numerals, it will be seen that 10 indicates generally a conventional and somewhat typical type of soldering iron.

In accordance with the present invention there is provided a reel 11 on which is wound the solder, the same being in the form of a flat strip or ribbon 12.

For supporting the reel 11 in operative position on the tool 10 there is provided a frame consisting of a pair of complemental half sections 13—13 each of which has parallel arms 13a between which the reel is journaled, said arms having the ends thereof pressed inwardly to provide trunnion-teats or bearings 14 which accommodate the hub of the reel 11 in a manner clearly shown in Figure 6 for rotatably supporting the reel in the frame. On the arms 13 are extensions 13b terminating in arcuate clamps or jaws 15 that embrace the barrel 10a of the tool as shown in Figures 1 and 4. The jaws 15 are held in clamped engagement with the barrel 10a through the medium of bolts 16 passing through aligned openings in the portions 13b of the frame and provided with springs 17 in a manner clearly shown in Figure 4.

Engaged with the barrel 10a slightly inwardly from the point of the barrel is a two-part clamp 16—16 whose jaw portions are formed with integral shanks secured together by bolt and nut means 17 as best shown in Figure 5. One of said shanks is slightly longer than the other as indicated at 18, and the free end of the shank extension 18 is pivoted as at 19 to a lug provided on a longitudinally curved tubular guide 20 which is preferably formed of aluminum or other suitable material and through which the solder ribbon or strip 12 is trained as shown in Figure 1 and directed toward the point of the tool as shown in said figure.

The aforementioned reel frame and clamp 16 are connected together through the medium of a bar 21 which is riveted or otherwise secured at one end to one of the parallel portions 13b of the reel frame and secured at its other end to the clamp 16 through the medium of the bolt 17.

A trigger 22 includes a body portion pivoted intermediate its ends as at 23 and at one end is suitably formed to provide a handle 24 located conveniently to the handle of the tool 10 so as to be readily manipulated by the thumb of the hand grasping the handle of the tool head. At its other end the body of the trigger 22 is longitudinally twisted as at 25 and in the end 25 thereof is provided with an opening 26 through which is trained the solder ribbon 12. On the side thereof opposite to the reel 11 the end 25 of the trigger above and below the opening 26 is provided with converging spring fingers 27 that yieldably engage the solder ribbon 12 to advance the ribbon toward the point of the tool when the trigger 22 by proper manipulation thereof is caused to rotate about its pivot 23 in a clockwise direction. A spring 28 secured at one end to the trigger 22 and at an opposite end to the frame 13 normally urges the trigger to rotate in an anti-clockwise direction as will be clear from a study of Figure 1.

An arm 29 is secured at one end in any suitable manner to the bar 21 and has a twisted end 30 provided with an opening 32 through which the solder ribbon 12 is trained. On one side thereof the end 30 of the bar 29 is provided with spring fingers 33 similar to the aforementioned spring fingers 27 and which engage the solder ribbon 12 in a manner to prevent retrograde movement of the ribbon upon retraction of the trigger 22.

In operation, it is evident that the tool can be held in one hand, and as the solder is used the operator feeds the solder wire forward through the guide 20 by engaging the thumb with the handle 24 of the trigger in a manner to cause the trigger to rotate in a clockwise direction. Upon release of the trigger the same will return under action of spring 28 to its normal position while the solder ribbon 12 will be held in its advanced position by reason of the engagement of the spring fingers 33 with the solder ribbon as thought to be apparent. Thus it will be seen that the tool may be handily used, and in actual practice it is believed that the same will be found to be free of numerous objections now raised against the so-called self-feeding soldering irons as are now known in the art.

Having thus described the invention, what is claimed as new is:

An attachment for soldering tools having handles at the rear ends thereof and portions extending forwardly from said handles, comprising a frame adapted to be fixed on and extend laterally from the forwardly extending portion of a soldering tool and having a bar adapted to rest alongside of said forwardly extending portion, a reel for solder in ribbon form carried by said frame, a curved guide for a solder ribbon pivoted to the frame and adapted to rest adjacent the forward end of a soldering tool, an arm carried by and extending from said bar of the frame and having an aperture for the passage of solder ribbon and also having forwardly directed fingers adapted to prevent retrograde movement of a solder ribbon, a lever fulcrumed at an intermediate point in its length on said frame bar and having an aperture for the passage of a solder ribbon in one of its arms and spring fingers at opposite sides of said aperture for engaging the ribbon and also having on its other arm a handle or thumb portion adapted to rest adjacent to the handle of a soldering tool, and a retractile spring interposed between the frame and the first-named arm of said lever and adapted to return the lever to normal position after it has been moved to advance a solder ribbon.

IRA RUSK.